US012428871B2

(12) United States Patent
Kapp et al.

(10) Patent No.: US 12,428,871 B2
(45) Date of Patent: Sep. 30, 2025

(54) NFC DRIVEN DISC LOCK

(71) Applicants: Robert Kapp, Cornelius, NC (US); Albert Brunner, Charlotte, NC (US); Todd Mory, Huntersville, NC (US); Daniel Schiermeyer, Mooresville, NC (US)

(72) Inventors: Robert Kapp, Cornelius, NC (US); Albert Brunner, Charlotte, NC (US); Todd Mory, Huntersville, NC (US); Daniel Schiermeyer, Mooresville, NC (US)

(*) Notice: Subject to any disclaimer, the term of this patent is extended or adjusted under 35 U.S.C. 154(b) by 0 days.

(21) Appl. No.: 17/300,332

(22) Filed: Jul. 12, 2023

(65) Prior Publication Data
US 2025/0019995 A1  Jan. 16, 2025

(51) Int. Cl.
E05B 67/28     (2006.01)
E05B 47/00     (2006.01)
H04B 5/24      (2024.01)
H04B 5/43      (2024.01)

(52) U.S. Cl.
CPC .......... *E05B 47/0012* (2013.01); *E05B 67/28* (2013.01); *H04B 5/24* (2024.01); *H04B 5/43* (2024.01); *E05B 2047/0024* (2013.01); *E05B 2047/0094* (2013.01)

(58) Field of Classification Search
CPC ........ E05B 67/28; E05B 71/00; E05B 15/006; E05B 17/2011
See application file for complete search history.

(56) References Cited

U.S. PATENT DOCUMENTS

| 8,850,858 B2 * | 10/2014 | Nave | E05B 67/02 70/279.1 |
| 10,220,899 B2 * | 3/2019 | Yang | E05B 71/00 |
| 11,879,274 B2 * | 1/2024 | Ku | E05B 71/00 |
| 2023/0106700 A1 * | 4/2023 | Lin | E05B 71/00 70/233 |

FOREIGN PATENT DOCUMENTS

| CN | 2695568 Y | * | 4/2005 | |
| CN | 110211264 A | * | 9/2019 | |
| WO | WO-2015045802 A1 | * | 4/2015 | E05B 67/22 |

* cited by examiner

Primary Examiner — Alyson M Merlino
(74) Attorney, Agent, or Firm — Sisson & Banyas, Attorneys at Law, LLC; Edwin A. Sisson; Jeffrey J. Banyas

(57) ABSTRACT

Described herein is a Near Field Communication disc lock. The disc lock has a near field communication antenna which receives the near field signal to lock or unlock the disc lock. The antenna passes the signal via wires to a near field circuit board which controls the lock motor which turns a lock cam to pressure or release a lock ball. The lock ball triggers the lock ball lever to lock or unlock the lock ring. In this manner, there is now an NFC lock which cannot be cut with bolt cutters.

4 Claims, 12 Drawing Sheets

NFC DRIVEN DISC LOCK

CROSS REFERENCES AND PRIORITIES

None

BACKGROUND

The prior art fails to teach or suggest a disc lock which can be locked and unlocked via near filed communication.

SUMMARY

The specification discloses a Near Field Communication (NFC) driven disc lock. The disc lock may comprise a lock ring, a top housing, a bottom housing with the top housing section and the bottom housing section forming an annular taurus shaped lock chamber, a housing notch, an antenna chamber with the lock chamber housing a lock mechanism and the antenna chamber houses an antenna system which is in communication with the lock mechanism.

It is further disclosed that the lock chamber may comprise a motor which when activated by the antenna system moves the lock mechanism from a locked position to an unlocked position or unlocked position to a locked position.

It also disclosed that the lock mechanism may comprises a lock ball cam, a lock ball, and a locking ball lever wherein the lock ball cam is configured to put pressure on the lock ball which pushes the ball lever into a lock notch in the lock ring or removes the pressure from the lock ball which allows the ball lever to come out of the lock notch in the lock ring allowing the ring to turn and open the exposed notch.

It is also further disclosed that the top housing section and the bottom housing section form an antenna chamber housing the antenna system with the antenna chamber located inside at least one of the spaces selected from the group consisting of a space defined by the lock ring, a space protruding tangentially from the annular taurus shape of the lock chamber, and a space protruding from the top or the bottom of the housing.

DETAILED DESCRIPTION

Figure 1:
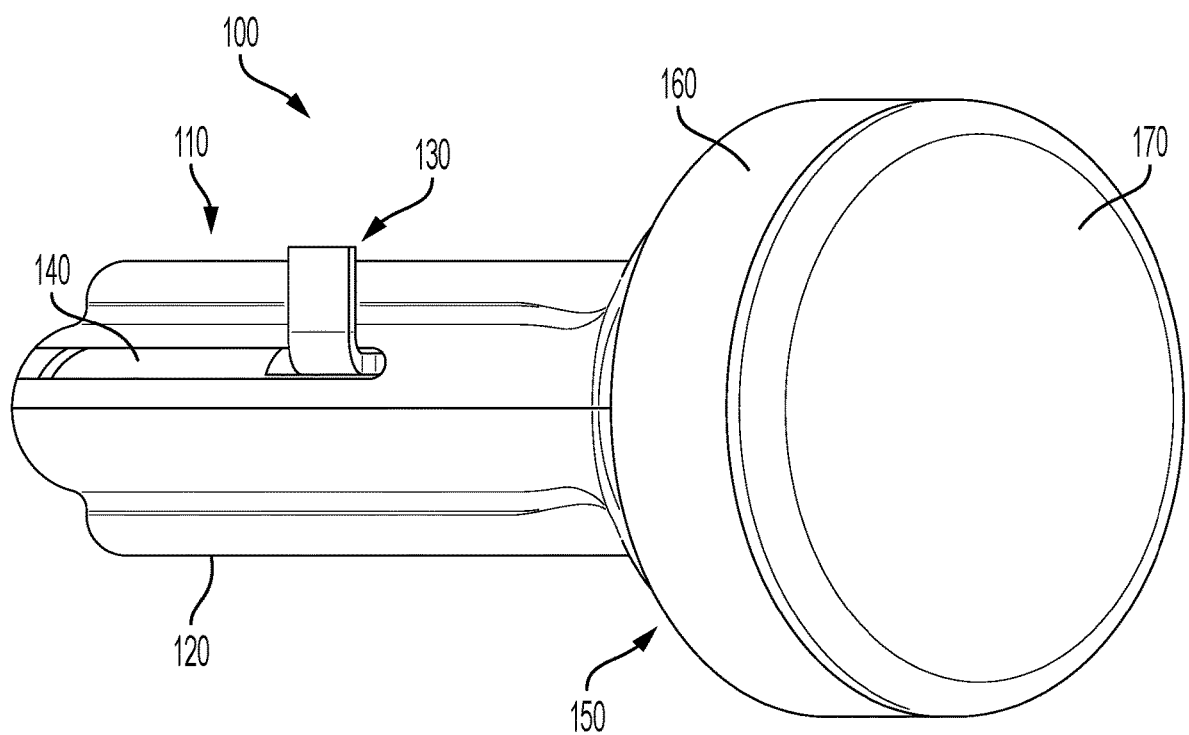
FIG. 1 is a front view of an embodiment of the invention.
Figure 2:
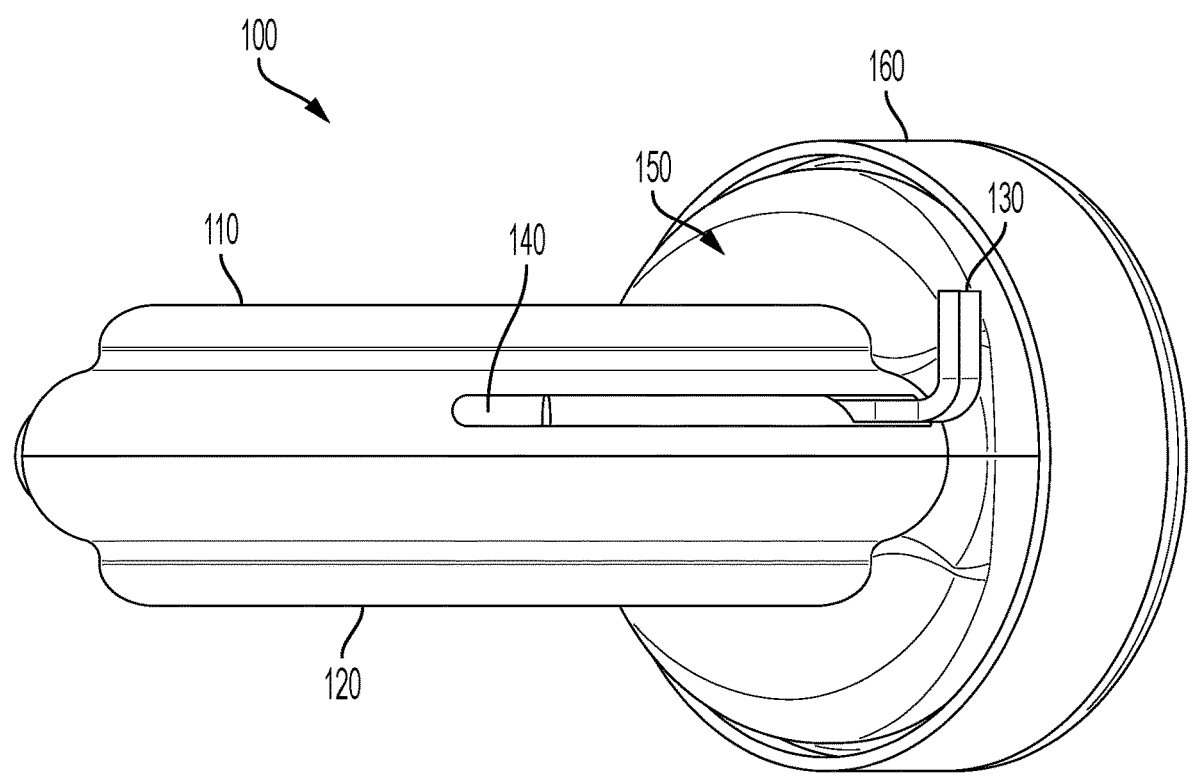
FIG. 2 is a left side view of an embodiment of the invention.
Figure 3:
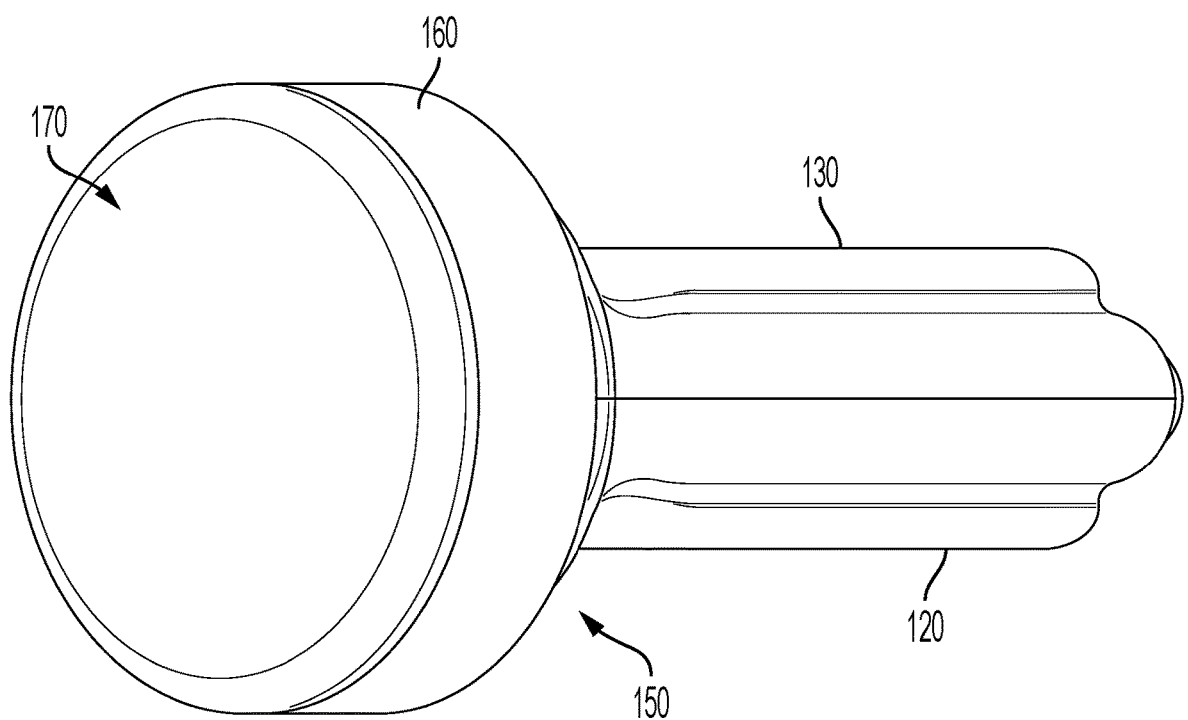
FIG. 3 is a right view of an embodiment of the invention.
Figure 4:
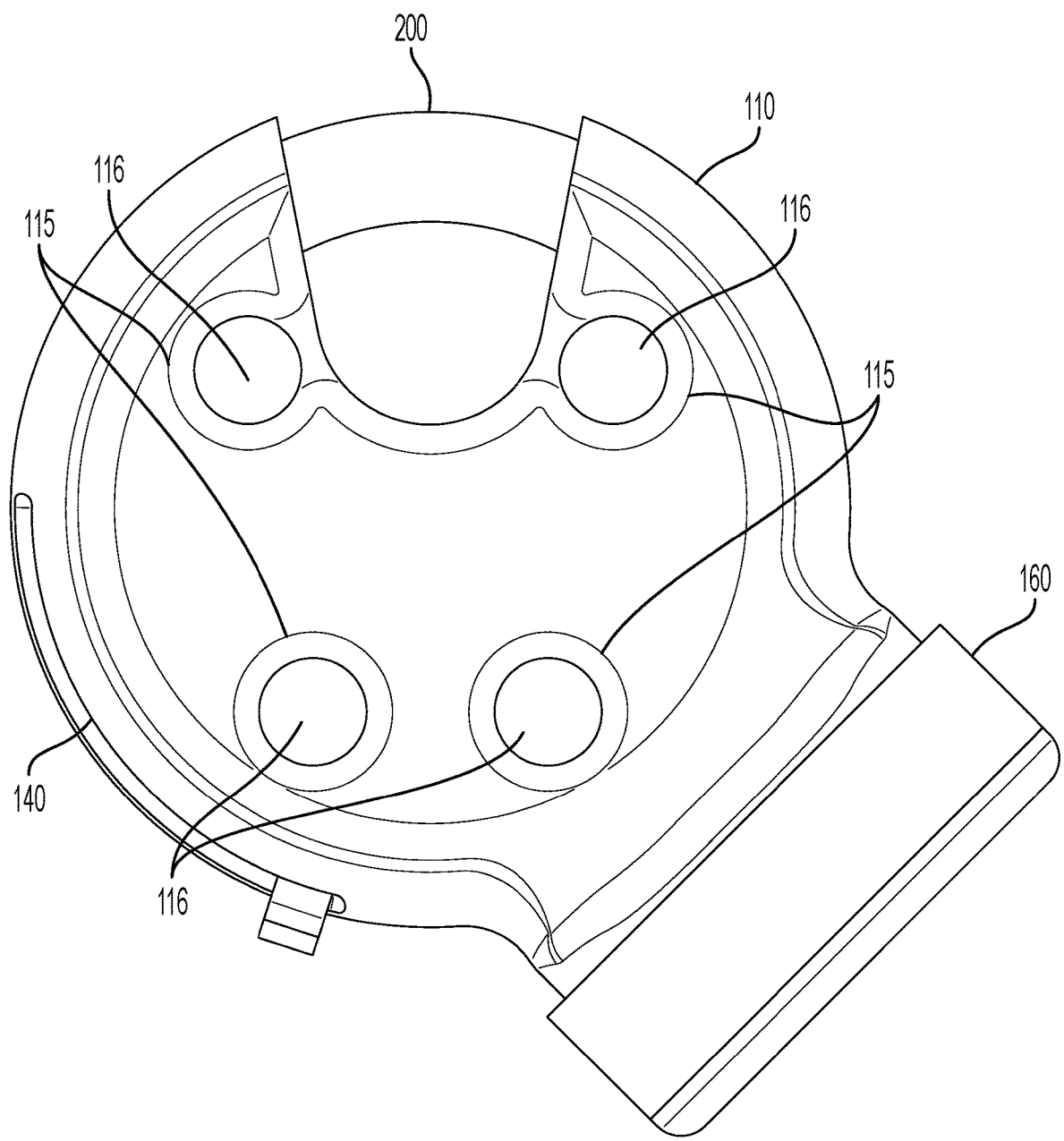
FIG. 4 is a top view of an embodiment of the invention.
Figure 5:
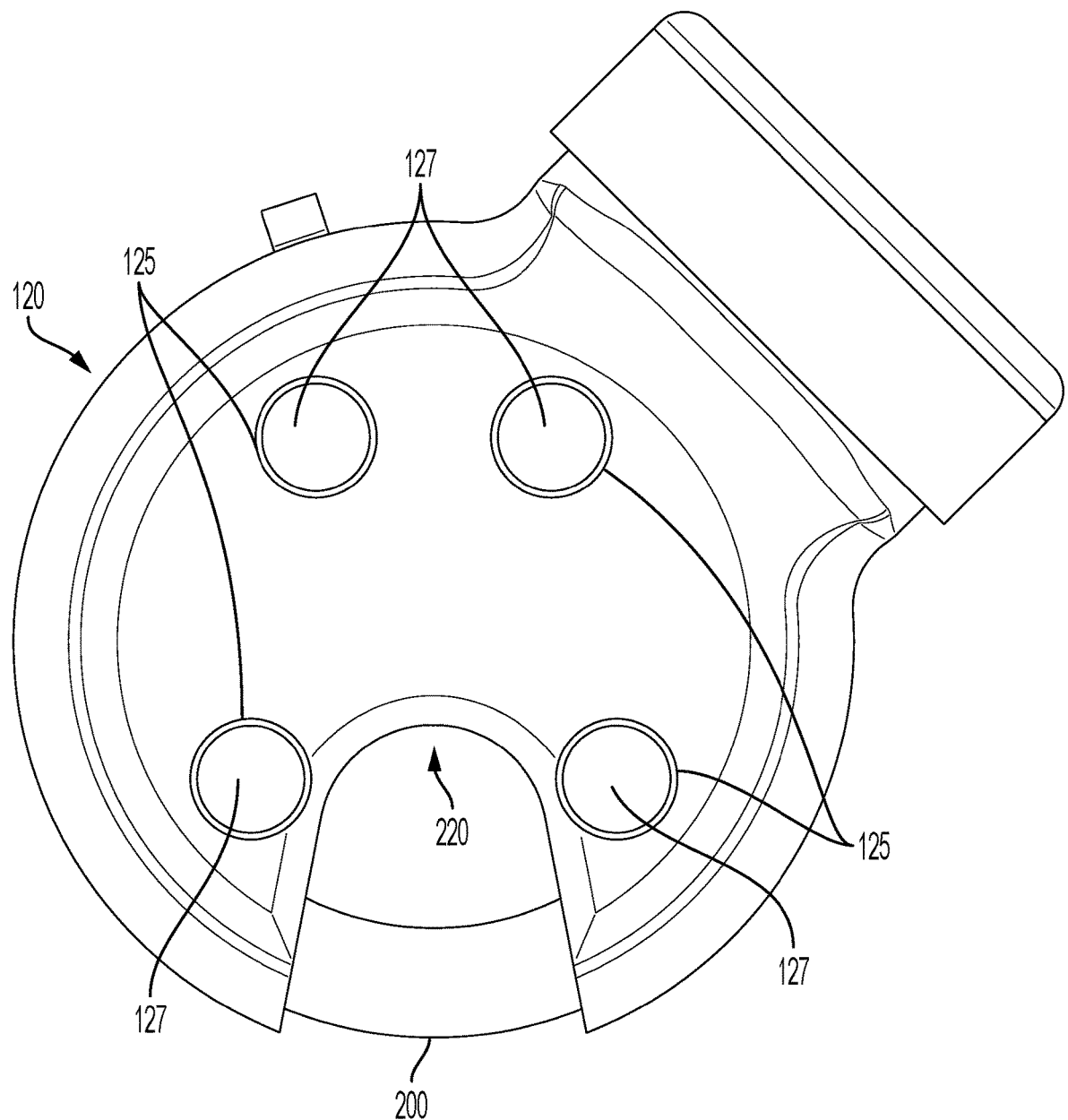
FIG. 5 is a bottom view of an embodiment of the invention.
Figure 6:
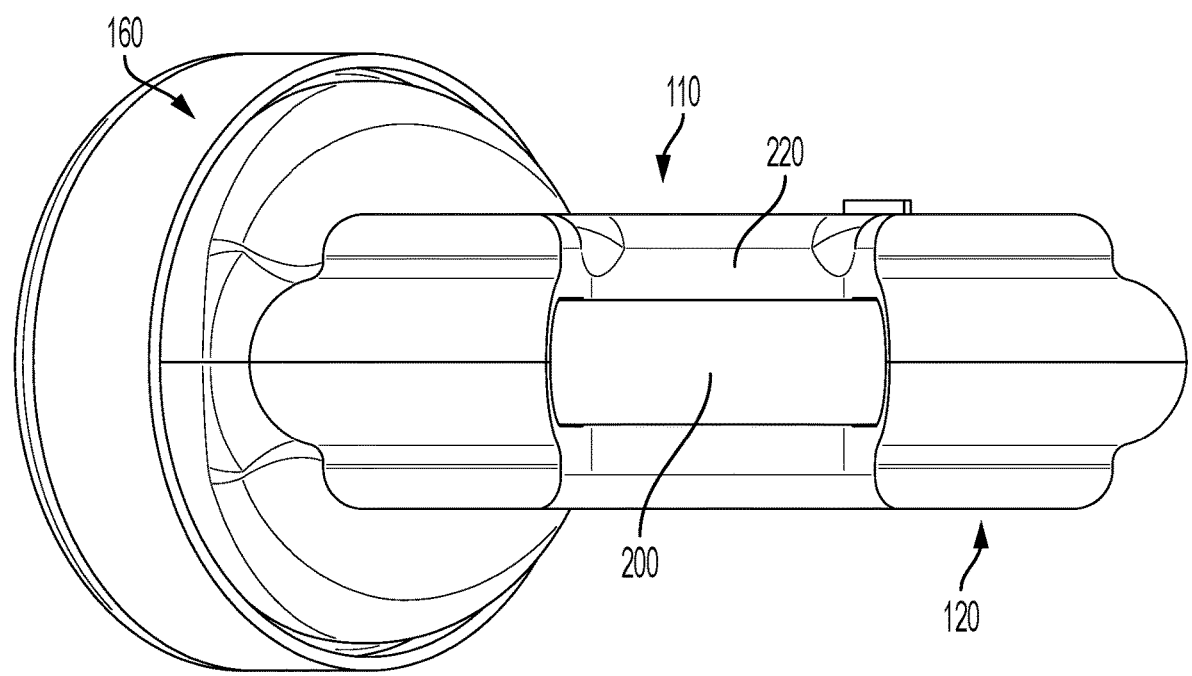
FIG. 6 is a back view of an embodiment of the invention.
Figure 7:
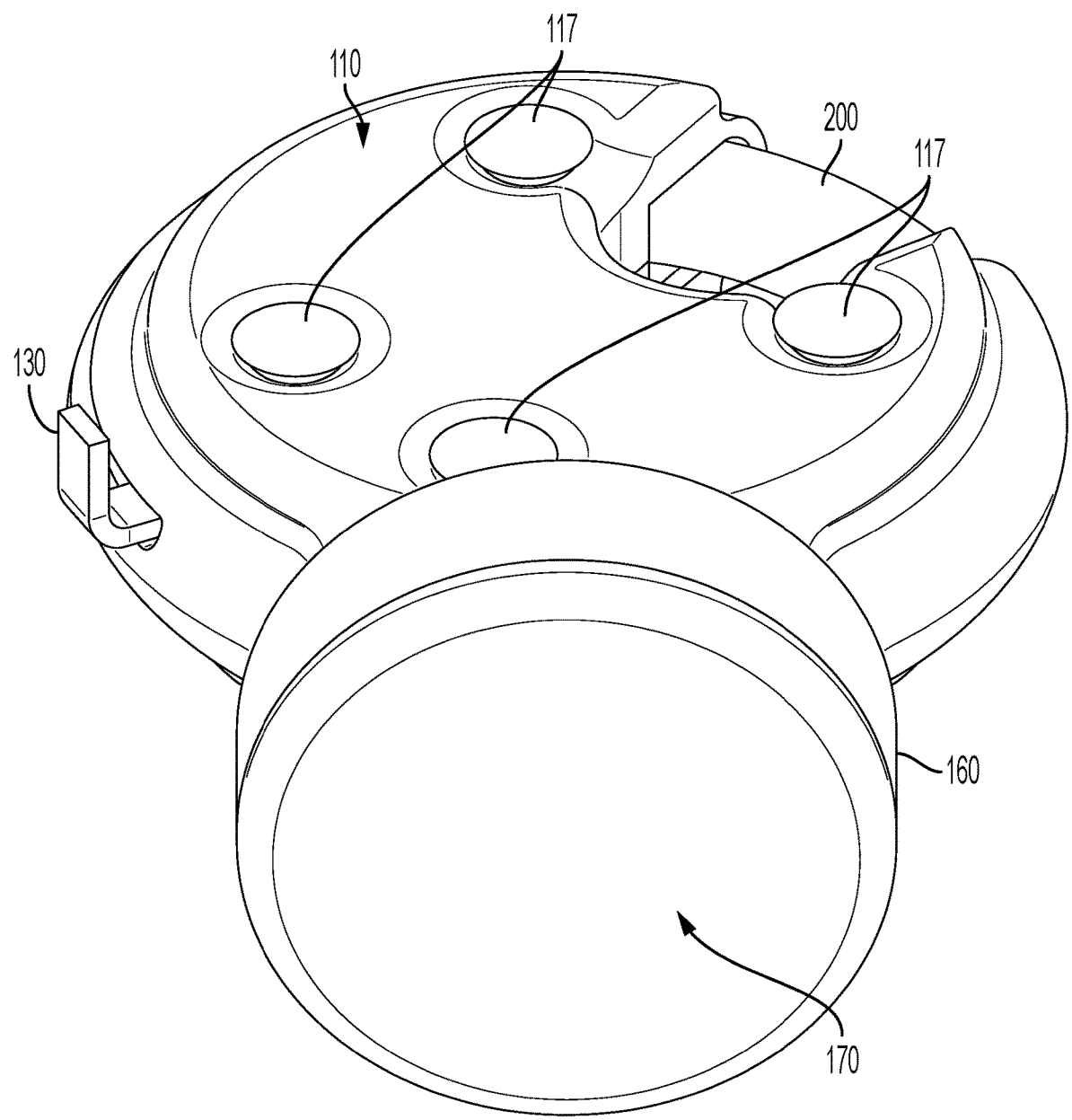
FIG. 7 is a front view of an embodiment of the invention.
Figure 8:
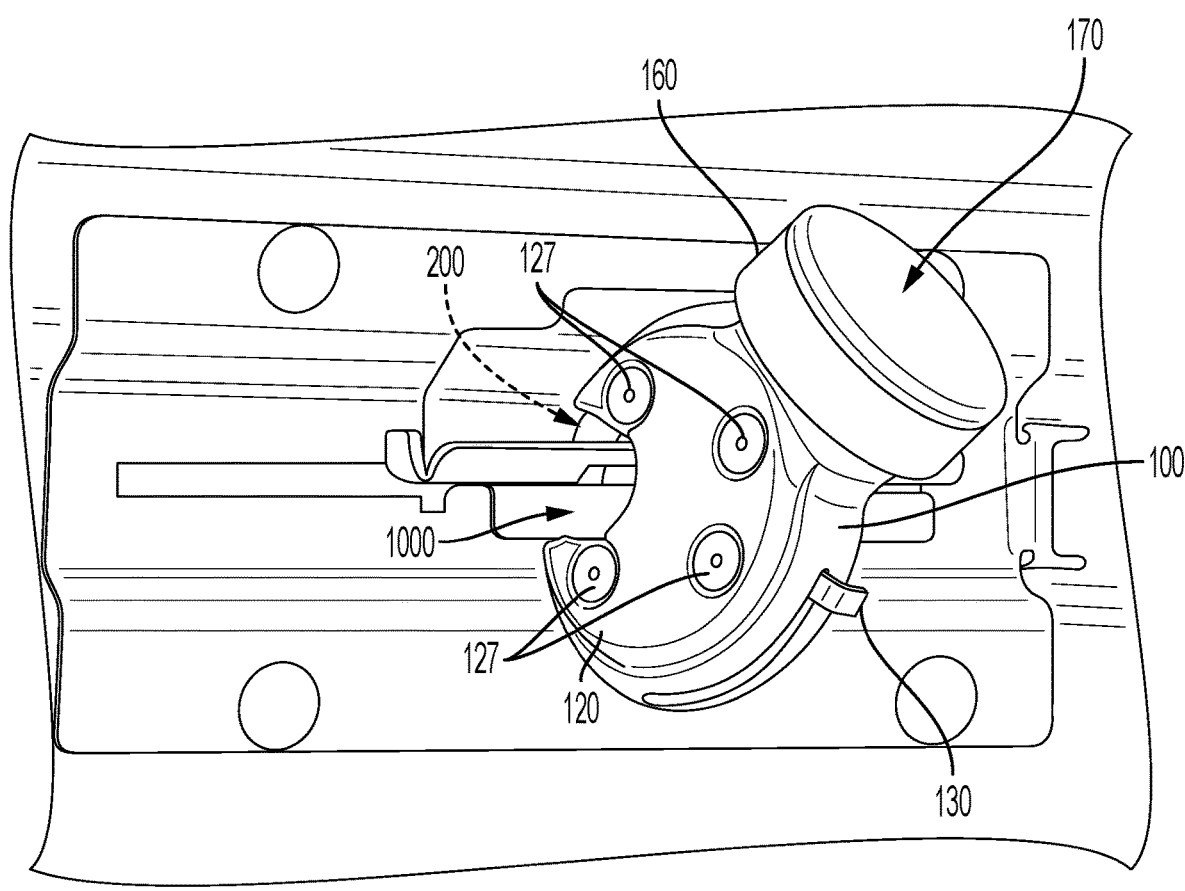
FIG. 8 is a perspective view of an embodiment of the invention in use.

100 is the assembled top housing section and bottom housing section forming the housing of the disc lock.
110 is the top housing section.
115 are the top housing holes.
117 are the top end of rivets.
120 is the bottom housing section.
125 are the bottom housing holes.
127 are bottom end rivets.
130 is a lock ring lever.
140 is a lock ring lever slot.
150 is an antenna housing.
160 is an antenna clip.
170 is an antenna cover.
200 is the lock ring.
210 is the lock chamber.
220 is the housing notch.
230 is the lock notch on the lock ring.
240 is the lock ball lever.
250 is the lock ball.
260 is the lock motor.
270 is the lock ball cam.
300 is the antenna system.
310 is the antenna cover.
320 is the backer disc.
330 is an armor disc.
340 is a circuit board disc.
345 is an NFC lock motor controller.
350 is an antenna.
360 is the antenna chamber.
1000 are the two brackets which are secured by the lock.

Disclosed herein is a disc lock (100) configured to be powered by near field communication (NFC). In operation, the user will configure the near field communication device, such as a cell phone, to either lock or unlock the lock. Once unlocked the user can rotate the lock ring (200) inside the housing (100) using the lock ring lever (130) which is attached to the lock ring and passes through a lock lever slot (140) in one of the top housing section or the bottom housing section as shown in FIGS. 1, 4, 7 and 8.

The housing may be comprised of a first housing section also known as the top housing section and a second housing section, also known as a bottom housing section. The top housing and bottom housing are configured to mate together and are secured to each other. In the examples there are 4 holes in each of the top and bottom housing (115 and 125, respectively). These housing components may be secured to each other via fasteners such as rivets, bolts, screws, or the like that pass through holes in first housing section face and the second housing section face. In this example the top and bottom housing sections are secured together by rivets (117 and 127, respectively.)

When the top housing section and the and bottom housing section are assembled, they will form a housing notch (220) for the locking of two pieces each having a hole. (1000) According to the well-known principles of a disc lock, the lock ring passes through the holes of the parts which have been placed into the notch. The application of the lock ring can be seen in FIG. 8.

In one embodiment, the mated top housing and bottom housing sections will form a lock chamber (210) and an antenna chamber (360). Because the disc lock is round, the lock chamber is also round and houses the lock ring around the inner circumference of the lock chamber as shown in FIGS. 9, 10, 11, and 12.

The antenna housing (150) contains the antenna chamber (360). The location of the antenna chamber relative to the lock chamber is not relevant. Typically the antenna housing is located outside the annular lock chamber housing such as in FIG. 1.

In one embodiment the antenna housing surrounds an antenna system (300) configured to receive an NFC signal and pass power to a motor which locks or unlock the lock ring so it can move.

As shown in this embodiment (FIG. 11) the antenna system comprises an antenna cover (310), an antenna (350) a backer disc (320), an armor disc (330). The armor disc comprises a very hard material, such as metal to protect the electronics from someone trying to poke into the circuit board, a circuit board disc (340), that has an NFC lock motor controller (345). When the antenna receives the signal to lock or unlock the disc lock, the signal is passed to the circuit board which passes the energy to power the lock motor (260) and turn the lock ball cam (260). The energy is typically passed to the motor via electric wires.

In another embodiment the antenna housing may protrude not from the annular curves of the lock housing but rise along a line perpendicular to the plane formed by the lock ring. This would place the antenna system so that the NFC communication is on the top or the bottom of the lock as oriented in FIGS. 1-7.

Another location for the antenna system is inside the lock housing surrounded by the lock ring. For preferable communications, the antenna should extend slightly past the lock ring along the z axis (top to bottom as oriented in FIGS. 1 to 7.

The lock chamber (210) comprises a lock ball lever (240), a lock ball (250), a lock motor with a drive shaft (260) that drives the lock ball cam (270).

Figure 9:
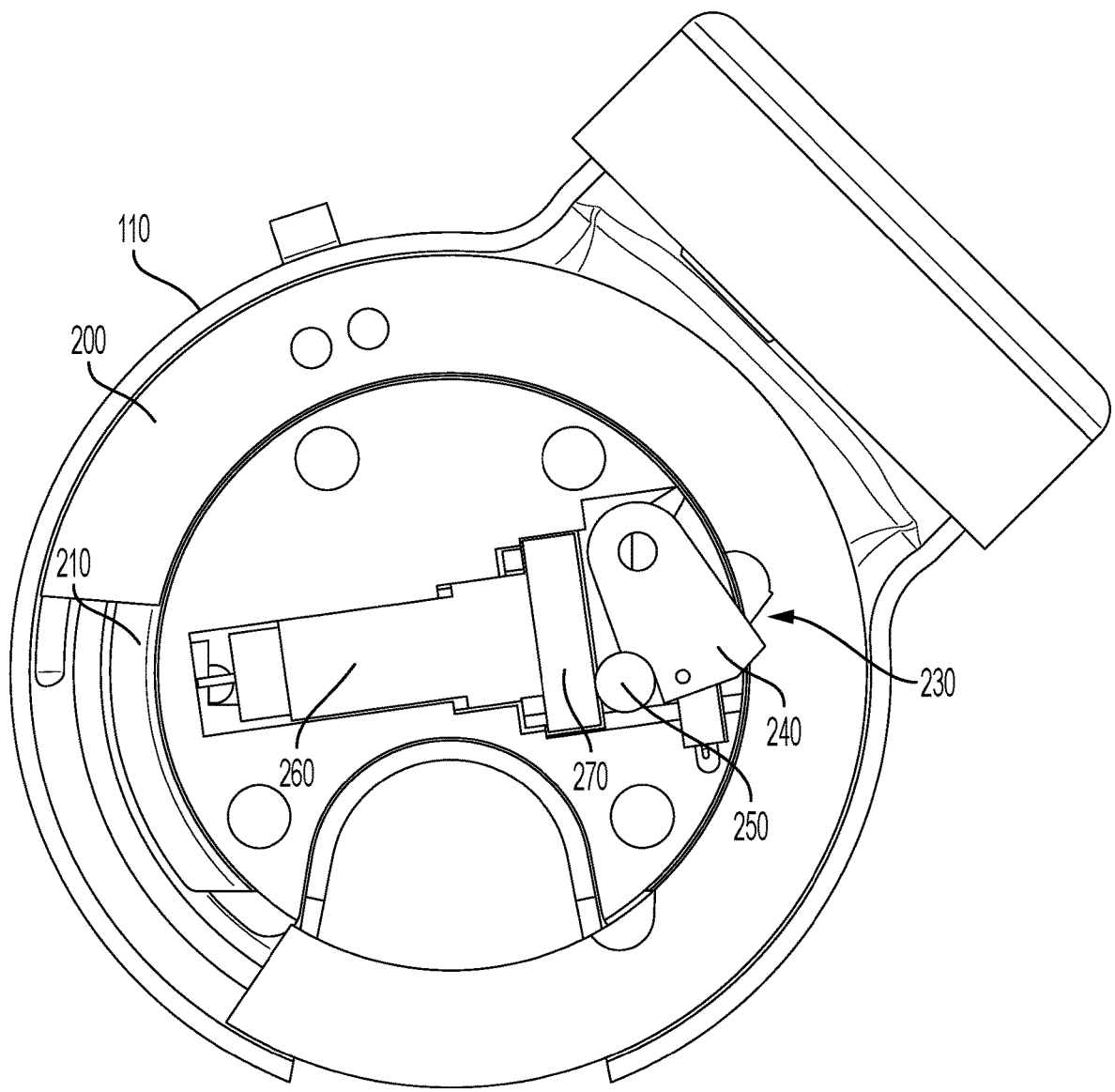
FIG. 9 is a cutaway of the lock chamber.
Figure 10:
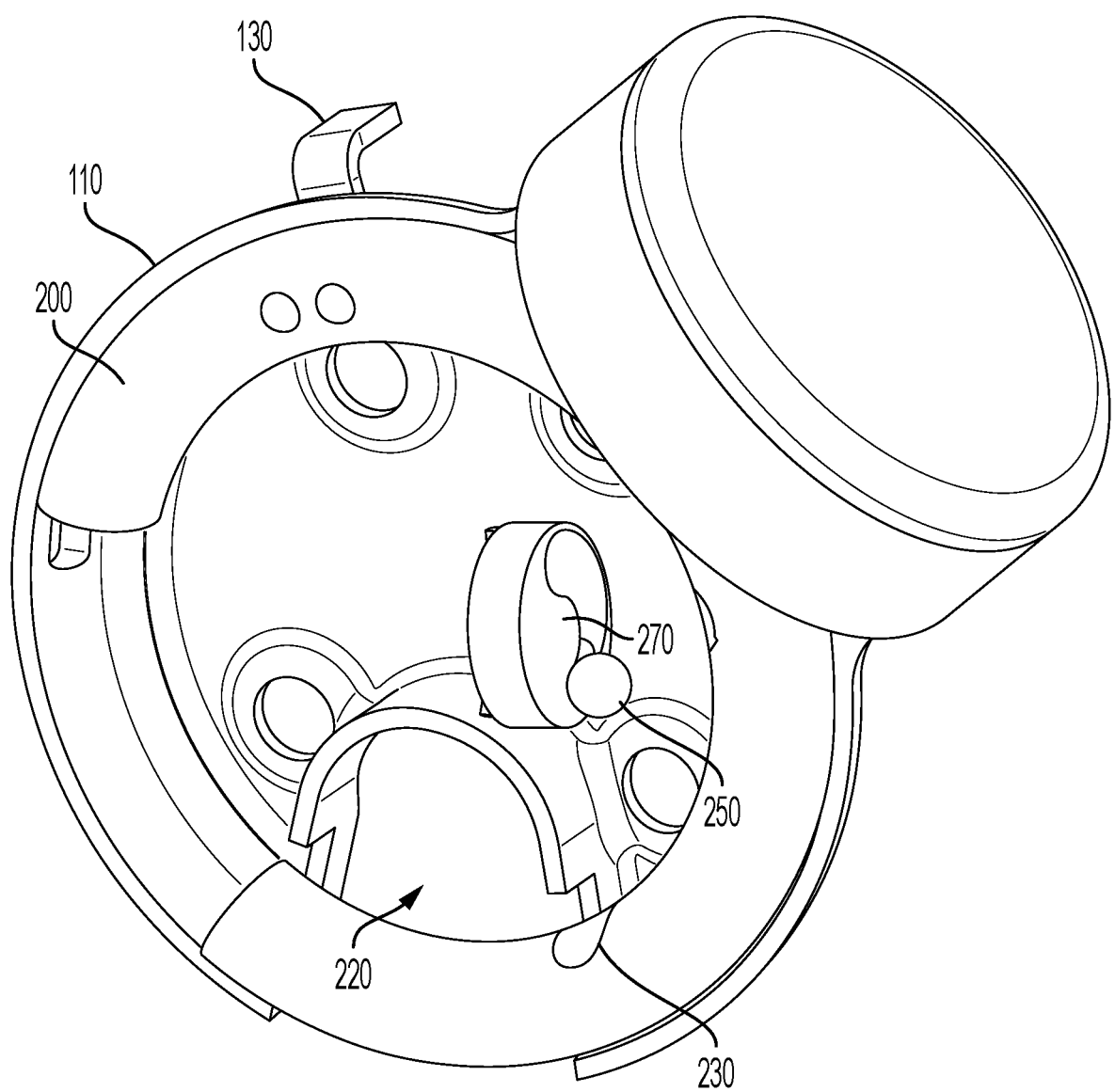
FIG. 10 is cutaway of the lock chamber.
Figure 11:
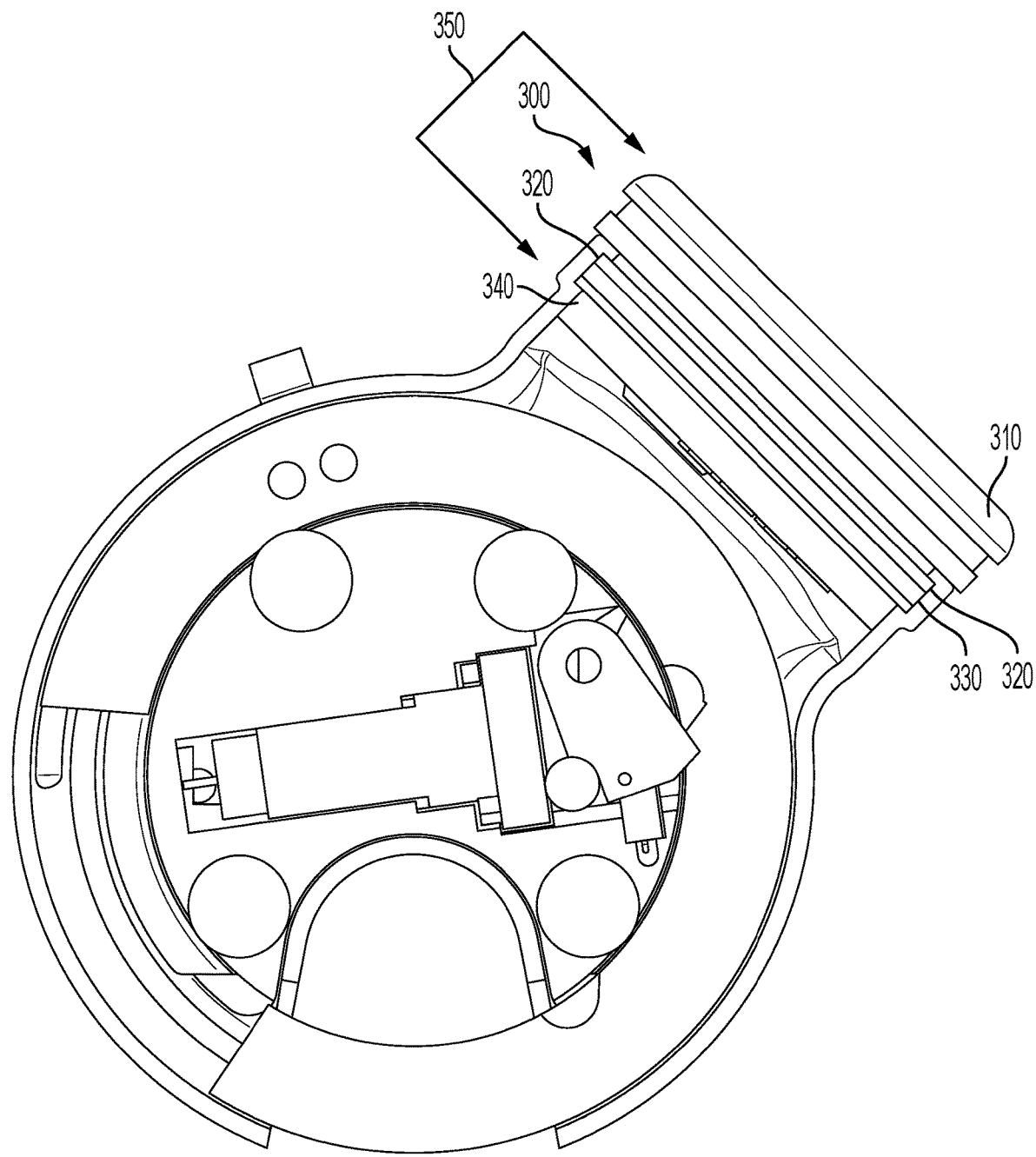
FIG. 11 is a cutaway view of the antenna chamber.
Figure 12:
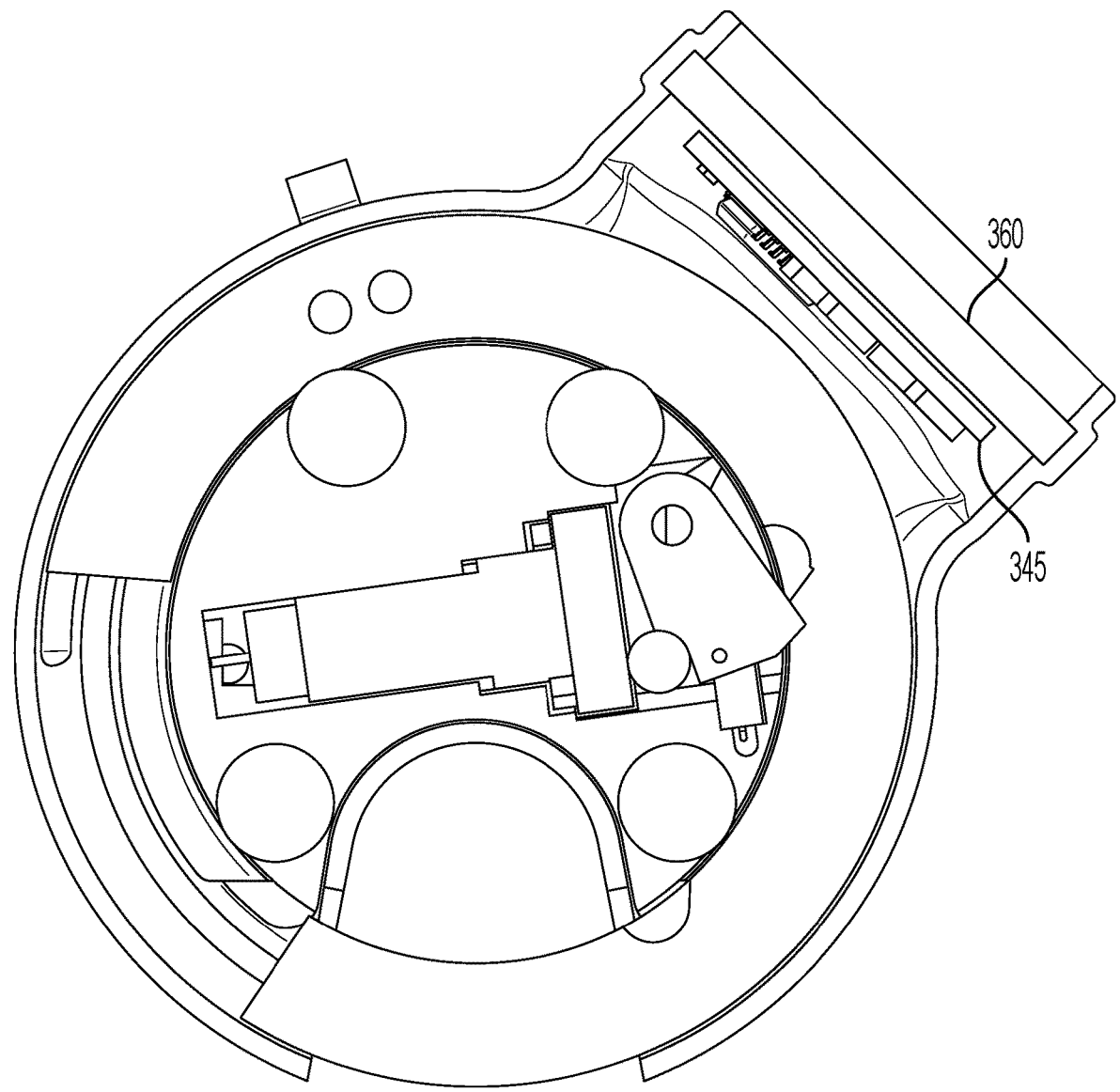
FIG. 12 is a cutaway view of the antenna chamber with all, but the NFC controller removed from the antenna chamber.

The operation of the lock and unlock in the lock chamber is explained by referring to FIG. 9 and FIG. 10. The motor will rotate the lock ball cam. FIG. 10 shows that the lock ball cam surface facing the lock ball has an indentation for the ball to rest which is the unlocked position. The position shown has ball resting on the surface without the indentation. In this position, the lock position, the lock ball is pushing on the lock ball lever (240) into the lock notch (230) preventing the lock ring from rotating.

When unlocked, the lock ball rests in the lock ball cam indentation, relieving the pressure. A spring, located behind the lock ball lever raises the lock ball level out of the lock notch and the lock ring can now be rotated as the lock is unlocked.

The materials of construction are to withstand a steady temperature of at least 160° F. which is the temperature the sun can heat the lock when used outdoors.

As the disc lock cannot be cut with a bolt cutter, it is believed that this is the first NFC driven lock that cannot be cut with a bolt cutter.

What is claimed is:

1. A disc lock comprising an antenna chamber, a lock ring, a top housing section, a bottom housing section assembled with the top housing section to form a housing having an annular shaped lock chamber and a housing notch, wherein the lock chamber houses a lock mechanism and the antenna chamber houses an antenna system, wherein the lock mechanism comprises a lock ball cam, a lock ball, and a lock ball lever, wherein the lock ball cam is configured to put pressure on the lock ball, which pushes the ball lever into a lock notch in the lock ring, thereby keeping the lock ring in a position in which the housing notch is closed by the lock ring and removes the pressure from the lock ball, which allows the lock ball lever to come out of the lock notch in the lock ring, thereby allowing the lock ring to rotate to a position in which the housing notch is open.

2. The disc lock of claim 1, wherein the top housing section and the bottom housing section form the antenna chamber, with the antenna chamber located inside, a space protruding tangentially from the annular shape of the lock chamber.

3. A disc lock comprising an antenna chamber, a lock ring, a top housing section, a bottom housing section assembled with the top housing section to form a housing having an annular shaped lock chamber and a housing notch, wherein the lock chamber houses a lock mechanism and the antenna chamber houses an antenna system, wherein the lock chamber comprises a motor, which when activated by the antenna system, moves the lock mechanism from a locked state to an unlocked state or from the unlocked state to the locked state wherein the lock mechanism comprises a lock ball cam, a lock ball, and a lock ball lever, wherein the lock ball cam is configured to put pressure on the lock ball, which pushes the lock ball lever into a lock notch in the lock ring, thereby keeping the lock ring in a position in which the housing notch is closed by the lock ring and removes the pressure from the lock ball, which allows the lock ball lever to come out of the lock notch in the lock ring, thereby allowing the lock ring to rotate to a position in which the housing notch is open.

4. The disc lock of claim 3, wherein the top housing section and the bottom housing section form the antenna chamber, with the antenna chamber located inside a space protruding tangentially from the annular shape of the lock chamber.

* * * * *